United States Patent
Iwanaga et al.

(10) Patent No.: US 12,209,613 B2
(45) Date of Patent: Jan. 28, 2025

(54) CROWN-SHAPED RETAINER FOR BALL BEARING AND BALL BEARING

(71) Applicant: NSK LTD., Tokyo (JP)

(72) Inventors: Yasuhiro Iwanaga, Fujisawa (JP); Yoshimune Shimokawa, Fujisawa (JP)

(73) Assignee: NSK LTD., Tokyo (JP)

( * ) Notice: Subject to any disclaimer, the term of this patent is extended or adjusted under 35 U.S.C. 154(b) by 210 days.

(21) Appl. No.: 17/908,788

(22) PCT Filed: Mar. 3, 2021

(86) PCT No.: PCT/JP2021/008281
§ 371 (c)(1),
(2) Date: Sep. 1, 2022

(87) PCT Pub. No.: WO2021/177380
PCT Pub. Date: Sep. 10, 2021

(65) Prior Publication Data
US 2023/0085727 A1    Mar. 23, 2023

(30) Foreign Application Priority Data
Mar. 3, 2020 (JP) ................ 2020-035971

(51) Int. Cl.
*F16C 19/16* (2006.01)
*F16C 33/38* (2006.01)
*F16C 33/41* (2006.01)

(52) U.S. Cl.
CPC .......... *F16C 33/3887* (2013.01); *F16C 19/16* (2013.01); *F16C 33/416* (2013.01); *F16C 33/418* (2013.01)

(58) Field of Classification Search
CPC .... F16C 19/16; F16C 33/3887; F16C 33/412; F16C 33/414; F16C 33/416; F16C 33/418
See application file for complete search history.

(56) References Cited

U.S. PATENT DOCUMENTS 8,568,035 B2 * 10/2013 Claude ................ F16C 33/44
                                                 384/531
2003/0235357 A1    12/2003    Hiramatsu
(Continued)

FOREIGN PATENT DOCUMENTS

EP    3 112 711 A1    1/2017
JP    54-145747 A    10/1979
(Continued)

OTHER PUBLICATIONS

Extended European Search Report dated Jun. 21, 2023, issued by the European Patent Office in counterpart European Patent Application No. 21765254.4.
(Continued)

*Primary Examiner* — Alan B Waits
(74) *Attorney, Agent, or Firm* — Sughrue Mion, PLLC

(57) ABSTRACT

A bar portion is formed so that an outer circumferential surface on a tip portion side is located on an inner diameter side with respect to an outer circumferential surface of a main portion. On an inner diameter side of a cage, lightened portions obtained by notching in an axial direction from an axial side surface of the main portion are formed separately at positions of the respective bar portions in a circumferential direction. Each lighting portion is formed separately from a surface of a pocket and an axially outer surface of the bar portion formed between a pair of claw portions. An axial dimension T1 of a wall portion formed between an axially outer surface of the bar portion and an inner wall surface of the lightened portion is greater than an axial dimension T2 of the main portion on a bottom portion of the pocket.

7 Claims, 9 Drawing Sheets

(56) References Cited

U.S. PATENT DOCUMENTS

| | | |
|---|---|---|
| 2009/0220181 A1 | 9/2009 | Yamada et al. |
| 2010/0046875 A1 | 2/2010 | Doyer et al. |
| 2016/0160921 A1 | 6/2016 | Cisco et al. |
| 2020/0018351 A1* | 1/2020 | An .................. F16C 33/418 |

FOREIGN PATENT DOCUMENTS

| | | |
|---|---|---|
| JP | 58-153625 A | 9/1983 |
| JP | 2003-269465 A | 9/2003 |
| JP | 2003-329045 A | 11/2003 |
| JP | 2004-19921 A | 1/2004 |
| JP | 2004-84770 A | 3/2004 |
| JP | 2008-240950 A | 10/2008 |
| JP | 2014-40916 A | 3/2014 |
| JP | 5436204 B2 | 3/2014 |

OTHER PUBLICATIONS

Communication dated Mar. 19, 2024, issued by the Japanese Patent Office in Japanese Application No. 2020-035971.
International Search Report (PCT/ISA/210) issued Apr. 6, 2021 by the International Searching Authority in counterpart International Application No. PCT/JP2021/008281.
Written Opinion (PCT/ISA/237) issued Apr. 6, 2021 by the International Searching Authority in counterpart International Application No. PCT/JP2021/008281.

* cited by examiner

CROWN-SHAPED RETAINER FOR BALL BEARING AND BALL BEARING

CROSS-REFERENCE TO RELATED APPLICATIONS

This application is a National Phase Entry of PCT International Application No PCT/JP2021/008281 filed Mar. 3, 2021, which claims priority to Japanese Patent Application No. 2020-035971 filed Mar. 3, 2020.

TECHNICAL FIELD

The present invention relates to a snap cage for a ball bearing and a ball bearing, and particularly, to a snap cage for a ball bearing and a ball bearing applied to a high-speed motor.

BACKGROUND ART

In general, a ball bearing 1 as shown in FIG. 11 is used to support rotating portions of various rotary machines. The ball bearing 1 includes an inner ring 3 having an inner ring raceway 2 on an outer circumferential surface thereof, an outer ring 5 disposed concentrically with the inner ring 3 and having an outer ring raceway 4 on an inner circumferential surface thereof, and a plurality of balls 6 disposed between the inner ring raceway 2 and the outer ring raceway 4 so as to roll freely. Each ball 6 is rollably held by a cage 100. Further, outer peripheral edges of circular ring-shaped shield plates 7, 7 are respectively locked to inner circumferential surfaces of both end portions of the outer ring 5, and the shield plates 7, 7 prevent a lubricant such as grease present in a bearing space from leaking to an outside or prevent dust floating in the outside from entering the bearing space. As a sealing device, a contact type seal may be used instead of the non-contact type shield plates 7, 7.

As shown in FIG. 12, a snap cage made of plastic is used as the cage 100 and includes an annular main portion 109 and a plurality of bar portions 110 protruding axially from the main portion 109 at predetermined intervals in a circumferential direction, and each of spherical pockets 111 for holding the balls 6 is formed between the adjacent bar portions 110. Further, a pair of claw portions 112, 112 disposed at intervals from each other are formed at a tip portion of the bar portion 110, and the cage 100 is prevented from falling off in an axial direction from between the outer ring 5 and the inner ring 3 by holding the balls 6.

When the cage 100 used in such a ball bearing is used at a high speed, the claw portions 112, 112 are deformed radially outward due to an application of a stress caused by centrifugal force. As a result, the cage 100 comes into contact with other components such as the outer ring 5 and the shield plates 7, 7, and the cage 100 may be worn or damaged.

A cage described in Patent Literature 1 includes an annular main portion and an elastic piece protruding from the annular main portion to one side in an axial direction, and an outer diameter of the elastic piece is made smaller than an outer diameter of the annular main portion by providing a notch in an outer diameter surface of the elastic piece. Accordingly, when the elastic piece is deformed, contact with an outer ring and a shield plate is avoided.

A cage described in Patent Literature 2 has an annular base portion and an axial portion extending in an axial direction from a base portion, an outer diameter of the axial portion is made smaller than an outer diameter of the base portion, and the base portion is formed with a hole penetrating in the axial direction and communicating with a recessed region of the axial portion. Accordingly, an amount of material is reduced, and deformation in a radial direction induced at high speed rotation is suppressed.

CITATION LIST

Patent Literature

Patent Literature 1: JP2003-329045A
Patent Literature 2: JP5436204B

SUMMARY OF INVENTION

Technical Problem

Incidentally, in the cage described in Patent Literature 1, the deformation of the elastic piece which is a bar portion may increase at high speed rotation, and further improvement is required. Further, in the cage described in Patent Literature 2, centrifugal force at high speed rotation is reduced by reducing the weight of the axial portion which is a bar portion, but since the hole penetrating in the axial direction and communicating with the recessed region of the axial portion is formed in the base portion, the rigidity of the base portion is reduced, which is disadvantageous to the deformation of the cage. It is advantageous for the deformation of the cage if the base portion is connected without the through hole. Further, in any of the cages, it is conceivable to make a main portion (base portion) thin at a bottom portion of a pocket in order to reduce the weight, but there is a problem that the stress of the cage increases at high speed rotation, and deformation of a claw portion increases.

The present invention has been made in view of the above circumstances, and an object thereof is to provide a snap cage for a ball bearing and a ball bearing less likely to be in contact with other components even in a case in which deformation occurs due to centrifugal force at high speed rotation, and capable of suppressing deformation at high speed rotation by ensuring rigidity of a predetermined portion while reducing the centrifugal force at the high speed rotation due to weight reduction.

SOLUTION TO PROBLEM

The above object of the present invention is achieved by the following configurations.

(1) A snap cage for a ball bearing includes:
an annular main portion; and
a plurality of bar portions axially protruding from the main portion at predetermined intervals in a circumferential direction, and each including a pair of claw portions disposed at a tip portion at intervals from each other, in which
a spherical pocket capable of holding a ball is formed between the adjacent bar portions,
the bar portion includes the pair of claw portions, and an outer circumferential surface thereof on a tip portion side is located on an inner diameter side with respect to an outer circumferential surface of the main portion,
on the inner diameter side of the cage, a plurality of lightened portions obtained by notching in the axial direction from an axial side surface of the main portion to the respective bar portions are formed separately at positions of the respective bar portions in a circumferential direction, each of the lightened portions is formed separately from a surface of the pocket and an axially outer surface of the bar portion formed between the pair of claw portions, and when an axial dimension of a wall portion formed between the axially outer surface of the bar portion and an inner wall surface of the lightened portion is T1 and an axial dimension of the main portion on a bottom portion of the pocket is T2, T2>T1 is satisfied.

(2) In the snap cage for a ball bearing according to (1), the outer circumferential surface of the bar portion on the tip portion side is located at a position between ½ and ¾ of a radial thickness T of the main portion from an inner circumferential surface of the cage in a radial direction.

(3) In the snap cage for a ball bearing according to (1) or (2), when a radial thickness of the main portion is T, T2>T/4.

(4) In the snap cage for a ball bearing according to any one of (1) to (3), the outer circumferential surface of the bar portion on the tip portion side and the outer circumferential surface of the main portion are connected by a concave curved surface, and the curved surface has a radius of curvature of 25 to 55% of a radial thickness T of the main portion.

(5) In the snap cage for a ball bearing according to any one of (1) to (4), a minimum radial thickness T3 of the bar portion in which the lightened portion is formed is substantially equal to the axial dimension T1 of the wall portion.

(6) In the snap cage for a ball bearing according to any one of (1) to (5), an entrance diameter of the pocket is 90 to 95% of a ball diameter.

(7) In the snap cage for a ball bearing according to any one of (1) to (6), a center of the pocket passes through the wall portion in the axial direction.

(8) A ball bearing includes:

an outer ring; an inner ring; a plurality of balls disposed between raceway surfaces of the outer ring and the inner ring; and the snap cage according to any one of (1) to (7).

Advantageous Effects of Invention

According to the snap cage for a ball bearing and the ball bearing of the present invention, contact with other components hardly occurs even in a case where deformation occurs due to centrifugal force at high speed rotation, and it is possible to suppress deformation at high speed rotation by ensuring rigidity of a predetermined portion while reducing the centrifugal force at the high speed rotation due to weight reduction.

DESCRIPTION OF EMBODIMENTS

Hereinafter, a snap cage for a ball bearing and a ball bearing according to an embodiment of the present invention will be described with reference to the drawings.

Figure 1:
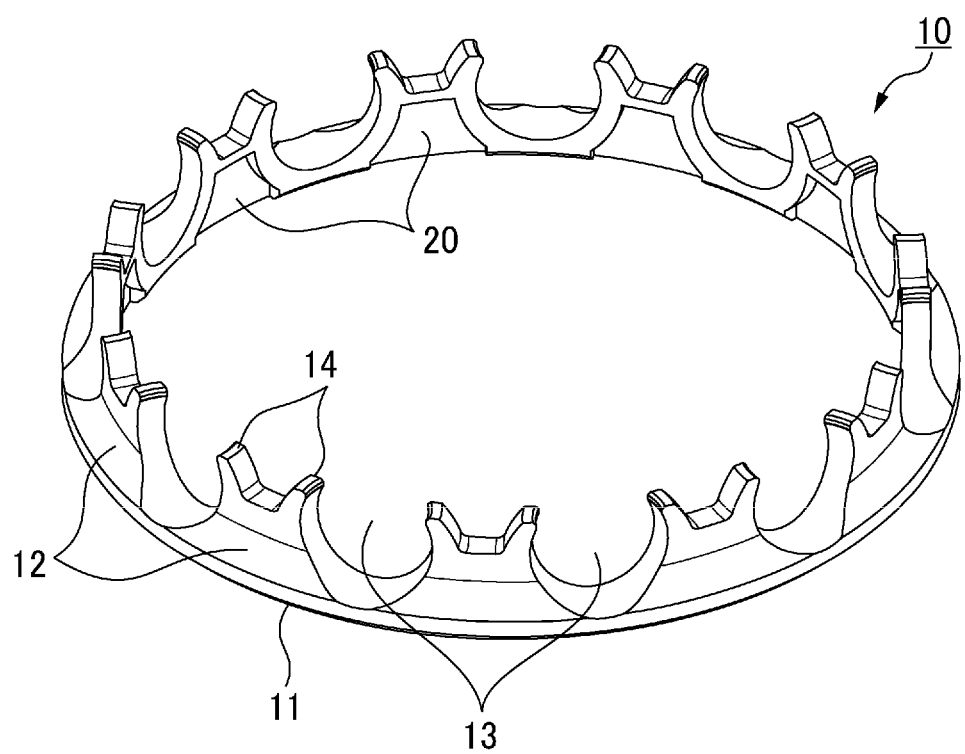
FIG. 1 is a perspective view of a snap cage for a ball bearing according to an embodiment of the present invention.
Figure 11:
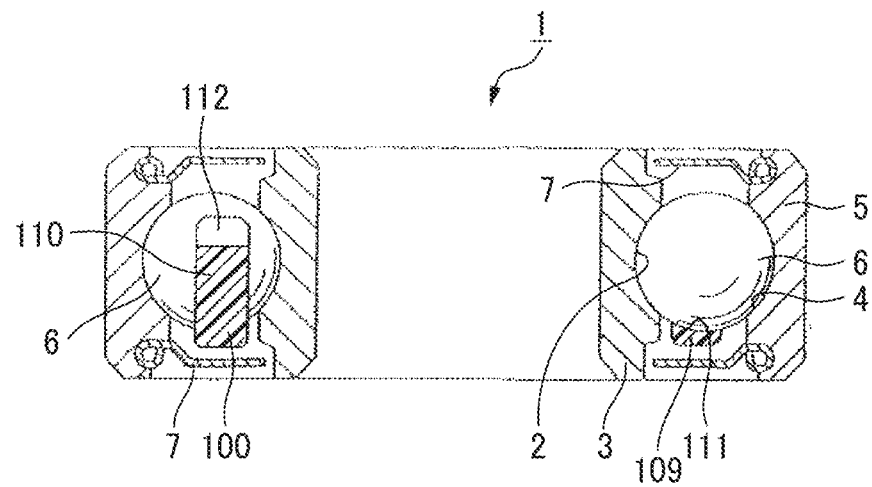
FIG. 11 is a cross-sectional view showing an example of a ball bearing in which a cage is incorporated.
Figure 12:
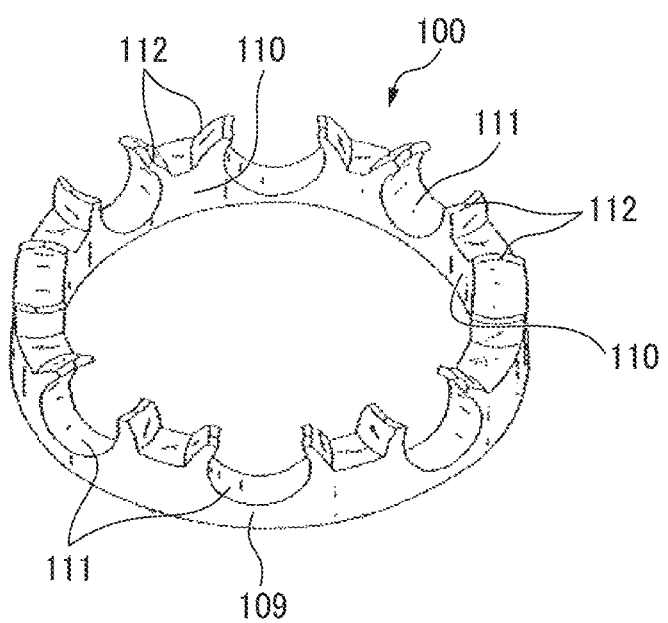
FIG. 12 is a perspective view showing an example of a structure of a cage in the related art.

As shown in FIG. 1, similar to a cage having a structure in the related art shown in FIG. 12, a snap cage for a ball bearing (hereinafter, also referred to as "snap cage" or simply "cage") 10 of the present embodiment is applied to a ball bearing 1 shown in FIG. 11. That is, the snap cage 10 includes an annular main portion 11 and a plurality of bar portions 12 protruding axially from the main portion 11 at predetermined intervals in a circumferential direction. Spherical pockets 13 each capable of holding a ball 6 (see FIG. 4) are formed between the adjacent bar portions 12. Further, a pair of claw portions 14, 14 disposed at intervals from each other and forming an opening portion side of the pocket 13 are provided at a tip portion of the bar portion 12.

The snap cage 10 is made of, for example, a synthetic resin material such as a polyamide resin, a polyacetal resin, polyphenylene sulfide, and polyetheretherketone, polyimide, and is manufactured by injection molding. A glass fiber, a carbon fiber, an aramid fiber, or the like may be added as a reinforcing material to the resin material.

Figure 2:
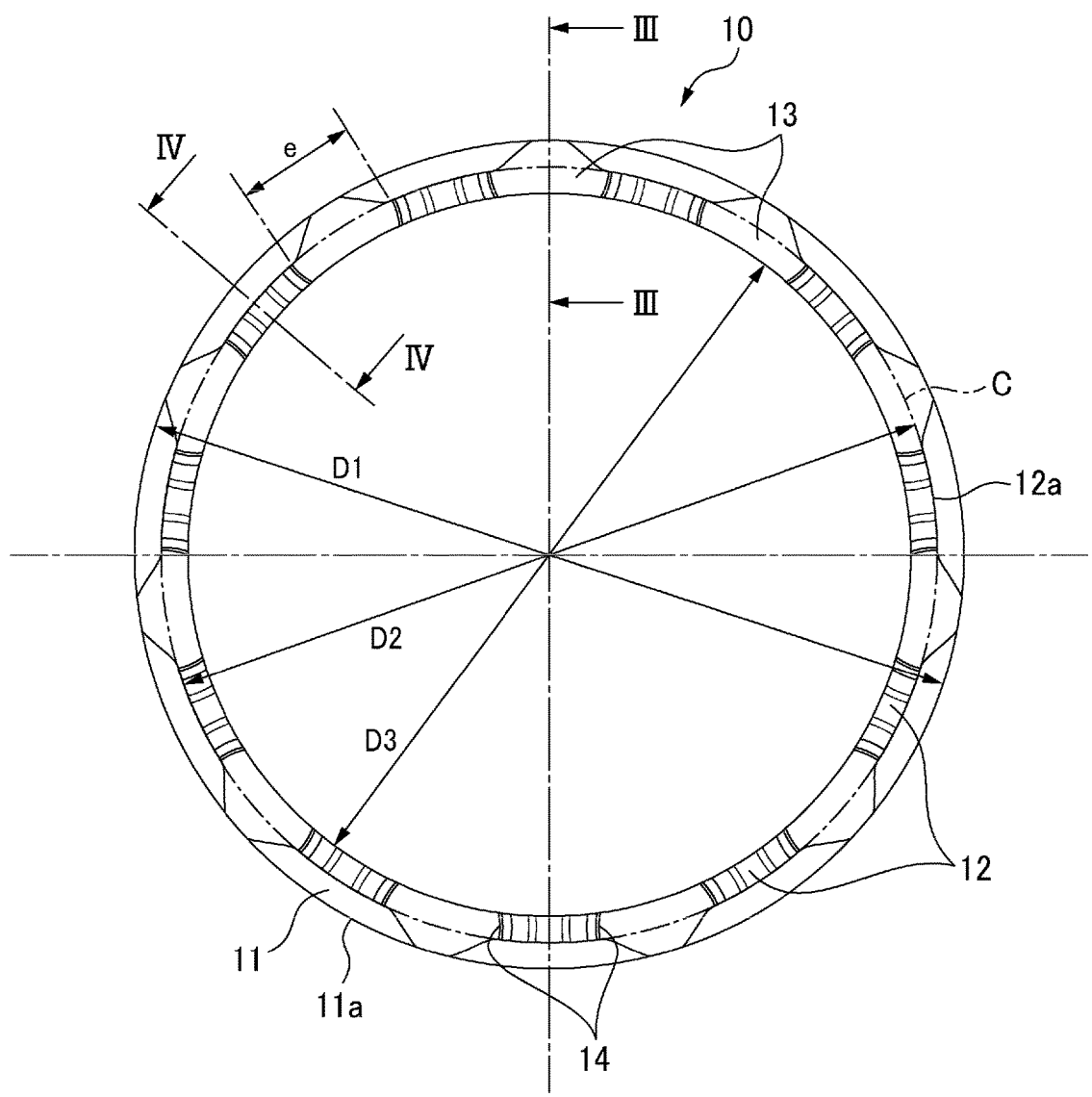
FIG. 2 is a front view of the snap cage of FIG. 1.
Figure 3:
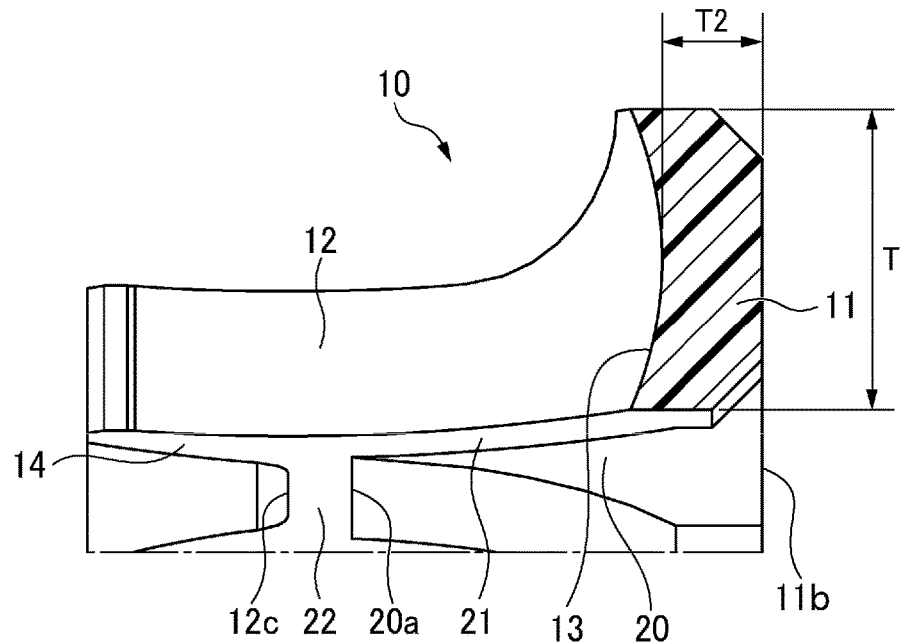
FIG. 3 is a cross-sectional view of the snap cage of FIG. 2 taken along line III-III.
Figure 4:
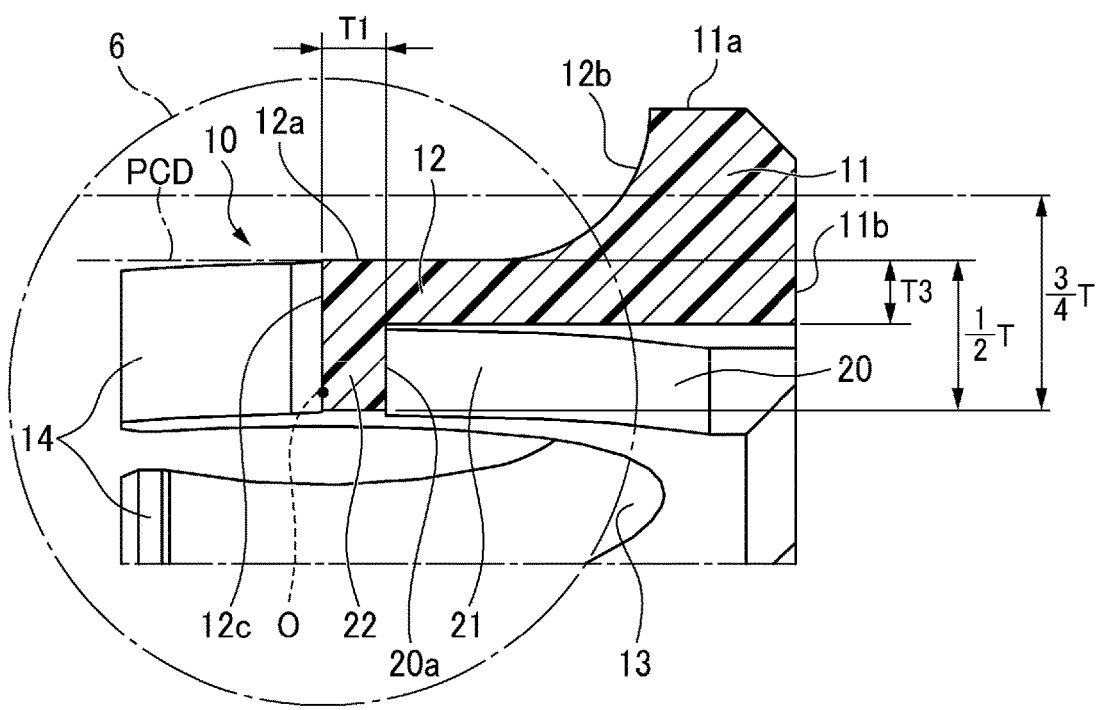
FIG. 4 is a cross-sectional view of the snap cage of FIG. 2 taken along line IV-IV.

Further, as shown in FIGS. 2 to 4, in the snap cage 10, the bar portion 12 includes a pair of claw portions 14, 14, and an outer circumferential surface 12a on a tip portion side is located on an inner diameter side with respect to an outer circumferential surface 11a of the main portion 11. That is, as shown in FIG. 2, a diameter D2 of a virtual circle C connecting the outer circumferential surface 12a on the tip portion side of each bar portion 12 is smaller than an outer diameter D1 of the outer circumferential surface 11a of the main portion 11.

Further, as shown in FIG. 4, in the bar portion 12, the outer circumferential surface 12a on the tip portion side extends to a main portion 11 side with respect to a center O of the pocket 13 in the axial direction, and is connected to the outer circumferential surface 11a of the main portion 11 by a concave curved surface 12b. The concave curved surface 12b has a radius of curvature of 25 to 55% of a radial thickness T of the main portion 11. As described above, since the concave curved surface 12b has the radius of curvature of 55% or less of the radial thickness T of the main portion 11, a volume of the bar portion 12 can be suppressed, and an effect of suppressing the deformation of the cage 10 due to centrifugal force is high.

Specifically, the outer circumferential surface 12a on the tip portion side of the bar portion 12 is located at a position between ½ and ¾ of the radial thickness T of the main portion 11 from an inner circumferential surface of the cage 10 in a radial direction. In the present embodiment, the outer circumferential surface 12a on the tip portion side is located at a position corresponding to ½ of the radial thickness T of the main portion 11 from the inner circumferential surface of the cage 10 in the radial direction, that is, on a pitch circle diameter PCD of the ball 6.

Further, on an inner diameter side of the snap cage 10, a plurality of lightened portions 20 obtained by notching in the axial direction from an axially outer surface 11b of the main portion 11 to the respective bar portions 12 are formed separately at positions of the respective bar portions 12 in a circumferential direction. The plurality of lightened portions 20 are opened to the inner diameter side and an axial outer surface 11b side of the main portion 11, and are formed separately from a surface of the pocket 13 and an axially outer surface 12c of the bar portion 12 formed between the pair of claw portions 14, 14. Wall portions 21, 22 are formed between the surface of the pocket 13 and an inner wall surface 20a of the lightened portion 20, and between the axially outer surface 12c on the tip portion side of the bar portion 12 and the inner wall surface 20a of the lightened portion 20, respectively.

Inner circumferential surfaces of the main portion 11 and the bar portion 12, which include the wall portions 21, 22 and exclude the lightened portion 20, constitute the inner circumferential surface of the cage 10 having an inner diameter D3 (see FIG. 2).

Further, the lightened portion 20 is formed in a substantially fan shape such that a width in the circumferential direction gradually decreases from the axially outer surface 11b of the main portion 11 to each of the bar portions 12. Further, the lightened portions 20 are notched at the same depth such that a minimum radial thickness T3 of the bar portion 12 defined between the inner circumferential surface of the lightened portion 20 and the outer circumferential surface 12a on the tip portion side of the bar portion 12 has the same thickness dimension along the circumferential direction.

Referring to FIGS. 3 and 4, when an axial dimension (thickness) of the wall portion 22 formed between the axially outer surface 12c on the tip portion side of the bar portion 12 and the inner wall surface 20a of the lightened portion 20 is T1 and an axial dimension (hereinafter, also referred to as "bottom thickness") of the main portion 11 on a bottom portion of the pocket 13 is T2, T2>T1 is designed. Accordingly, the bottom thickness T2 can be sufficiently ensured, the cage stress when the centrifugal force is applied can be reduced, and the axial dimension T1 of the wall portion 22 can be reduced to a thickness that does not cause any problem in injection molding, so that the weight reduction can be achieved, and deformation in the circumferential direction at high speed rotation can be suppressed.

In the present embodiment, the bottom thickness T2 has a relationship of T2>T/4 with respect to the radial thickness T of the main portion 11, the bottom thickness T2 can be further sufficiently ensured, and the cage stress when centrifugal force is applied can be reduced.

Further, the minimum radial thickness T3 of the bar portion 12 in which the lightened portion 20 is formed is designed to be substantially equal to the axial dimension T1 of the wall portion 22 so as not to cause any problem in injection molding. Accordingly, the minimum radial thickness T3 of the bar portion 12 is reduced as much as possible to reduce the weight of the cage 10.

In addition, since the center O of the pocket 13 passes through the wall portion 22 in the axial direction, the cage 10 is less likely to fall off the balls 6 at the high speed rotation. In particular, in the present embodiment, the center O of the pocket 13 coincides with the axially outer surface 12c of the wall portion 22 in the axial direction.

Further, an entrance diameter e of the pocket 13 at the position of the pitch circle diameter PCD of the ball 6 is set to 90% to 95% of a ball diameter, and an entrance diameter e is reduced to prevent contact with the shield plate 7 and a seal member due to fall-off of the cage 10. In general, since the thickness of the claw portion 14 is large, when the insertion diameter e is reduced, there is a concern about mold removal during injection molding, and whitening and breakage of the claw portion 14 during assembly to the ball 6. However, by reducing the thickness of the claw portion 14, even if the entrance diameter e is reduced, the ball 6 can be easily inserted into the pocket 13, and the above concern is eliminated.

According to the snap cage 10 of the present embodiment configured as described above, since the bar portion 12 includes the pair of claw portions 14, 14, and the outer circumferential surface 12a on the tip portion side is located on the inner diameter side with respect to the outer circumferential surface 11a of the main portion 11, the deformation due to the centrifugal force can be suppressed, and even in a case where deformation occurs due to the centrifugal force at high speed rotation, contact with other components hardly occurs.

Further, on the inner diameter side of the cage 10, the plurality of lightened portions 20 obtained by notching in the axial direction from the axial side surface of the main portion 11 to the respective bar portions 12 are formed separately at the positions of the respective bar portions 12 in the circumferential direction.

Further, since the wall portion 22 is formed between the axially outer surface 12c on the tip portion side of the bar portion 12 and the inner wall surface 20a of the lightened portion 20, and an axial dimension T2 of the main portion 11 on the bottom portion of the pocket 13 is made thicker than the axial dimension T1 of the wall portion 22, it is possible to ensure rigidity at a portion of the main portion 11 constituting the bottom portion of the pocket 13, and to suppress the deformation at the high speed rotation. Further, since the wall portion 22 is left between the axially outer surface 12c on the tip portion side of the bar portion 12 and the inner wall surface 20a of the lightened portion 20, the deformation in the circumferential direction at the high speed rotation can be suppressed.

It should be noted that the present invention is not limited to the embodiment described above, and modifications, improvements, and the like can be made as appropriate.

Figure 5:
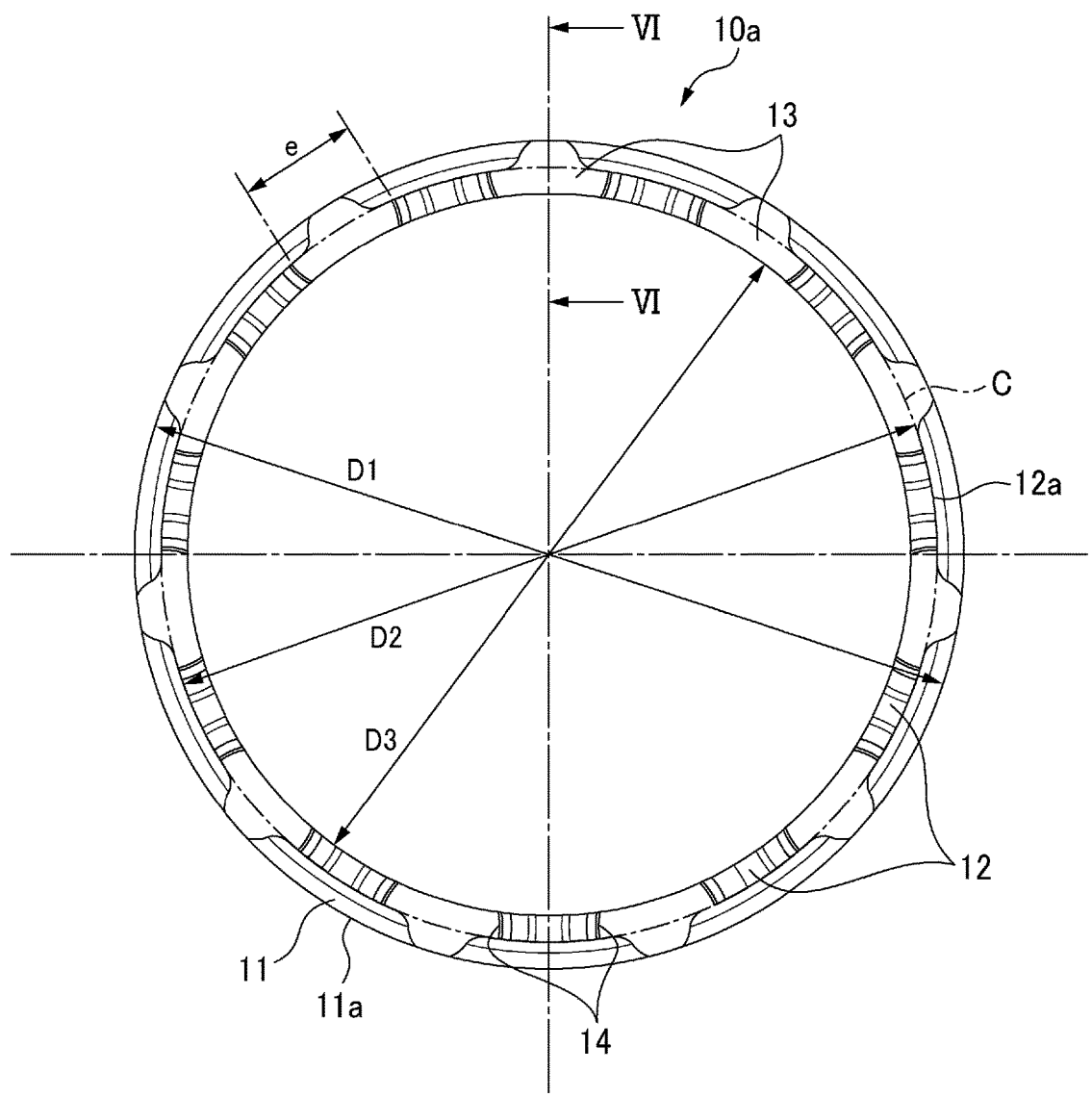
FIG. 5 is a front view of a snap cage for a ball bearing according to a modification of the present invention.
Figure 6:
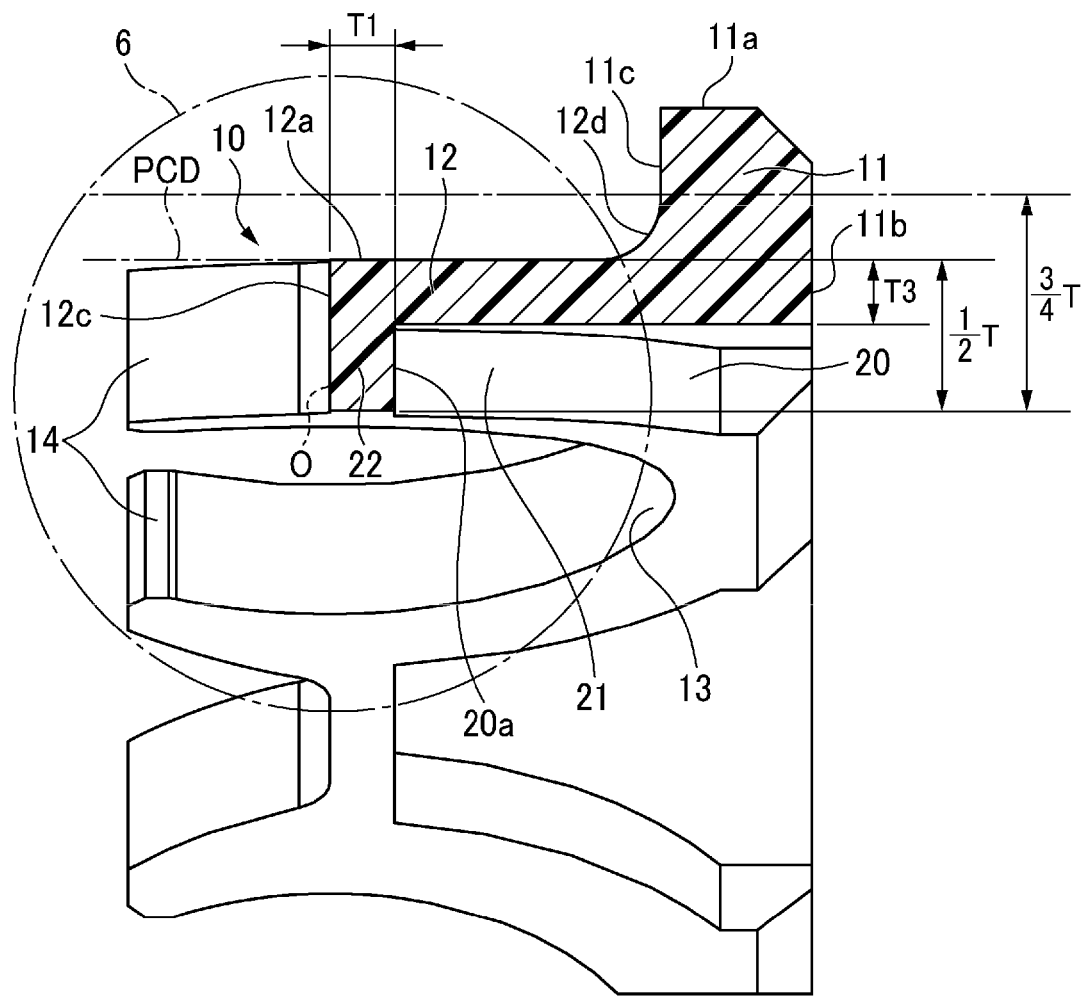
FIG. 6 is a cross-sectional view of the snap cage of FIG. 5 taken along line VI-VI.

For example, a snap cage 10a of a modification shown in FIG. 5 is different from that of a first embodiment in a shape of an outer diameter side. Specifically, an axial side surface 11c of the main portion 11 extending along the radial direction is formed between the outer circumferential surface 12a on the tip portion side of the bar portion 12 and the outer circumferential surface 11a of the main portion 11, and the outer circumferential surface 12a on the tip portion side of the bar portion 12 and the axial side surface 11c of the main portion 11 are connected by a concave curved surface 12d. In this modification, the axial side surface 11c of the main portion 11 is provided at a position slightly on the claw portion side from a groove bottom of the pocket 13 in the axial direction.

In this case, the snap cage 10a can be further reduced in weight as compared with the snap cage of the above embodiment.

Other configurations are similar to those of the snap cage 10 of the above embodiment.

Embodiment

Figure 7A:
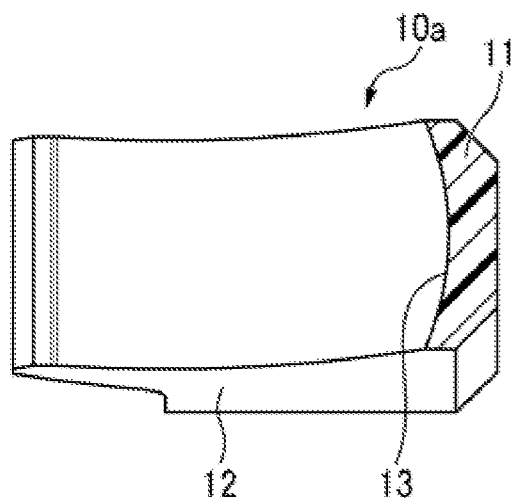
FIG. 7A is a cross-sectional view taken along an axial direction passing through a center of a pocket of a snap cage of Comparative Example 1.
Figure 7B:
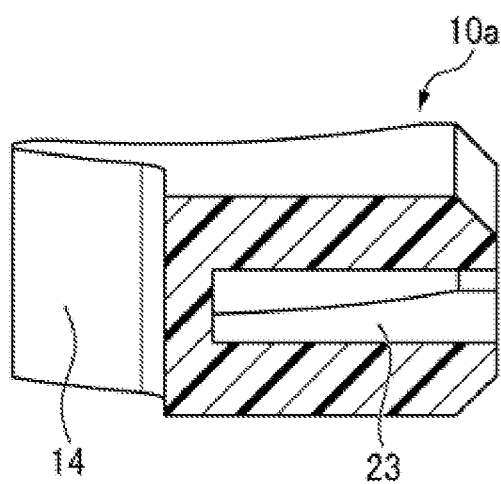
FIG. 7B is a cross-sectional view taken along the axial direction passing through an intermediate position in a circumferential direction of a bar portion of the snap cage of Comparative Example 1.
Figure 8A:
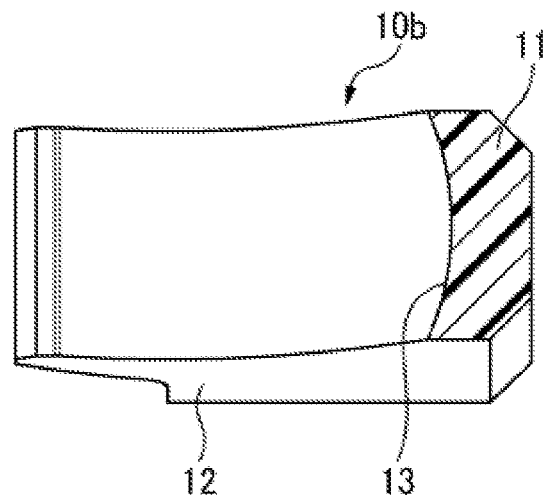
FIG. 8A is a cross-sectional view taken along an axial direction passing through a center of a pocket of a snap cage of Comparative Example 2.
Figure 8B:
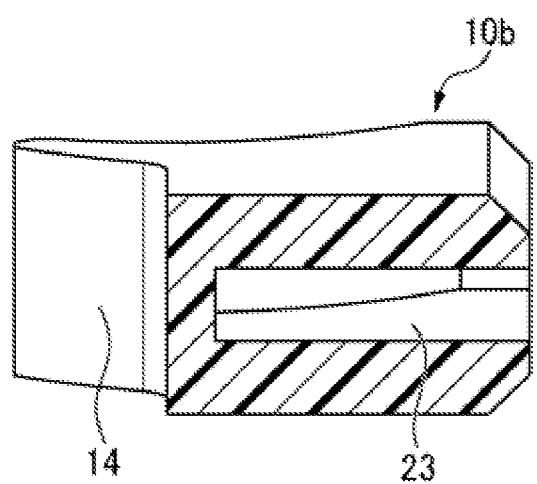
FIG. 8B is a cross-sectional view taken along the axial direction passing through an intermediate position in a circumferential direction of a bar portion of the snap cage of Comparative Example 2.

Here, a relationship between a rotation speed and a cage stress ratio, and a relationship between the rotation speed and a cage claw portion deformation amount ratio were analyzed using the snap cage 10 of the embodiment having the configuration shown in FIG. 1, the snap cage 10a of Comparative Example 1 shown in FIGS. 7A and 7B, and the snap cage 10b of Comparative Example 2 shown in FIGS. 8A and 8B.

In Comparative Example 1, the bottom thickness of the pocket 13 is reduced to a thickness that does not cause any problem in injection molding in order to reduce the weight of the cage 10a. Compared to Comparative Example 1, Comparative Example 2 has a specification in which the bottom thickness of the pocket 13 is increased to a thickness that is not in contact with the seal member in order to increase rigidity of the cage 10b. Further, in Comparative Examples 1 and 2, on the radially intermediate portions of the cages 10a, 10b, the lightened portions 23 notched in the axial direction from the axial side surface of the main portion 11 to the respective bar portions 12 are formed at the positions of the respective bar portions 12 in the circumferential direction. Table 1 shows the bottom thickness T2 and the weight of each of Embodiment, and Comparative Example 1 and 2 in terms of a ratio based on the bottom thickness T2 and the weight of Comparative Example 1.

Figure 9:
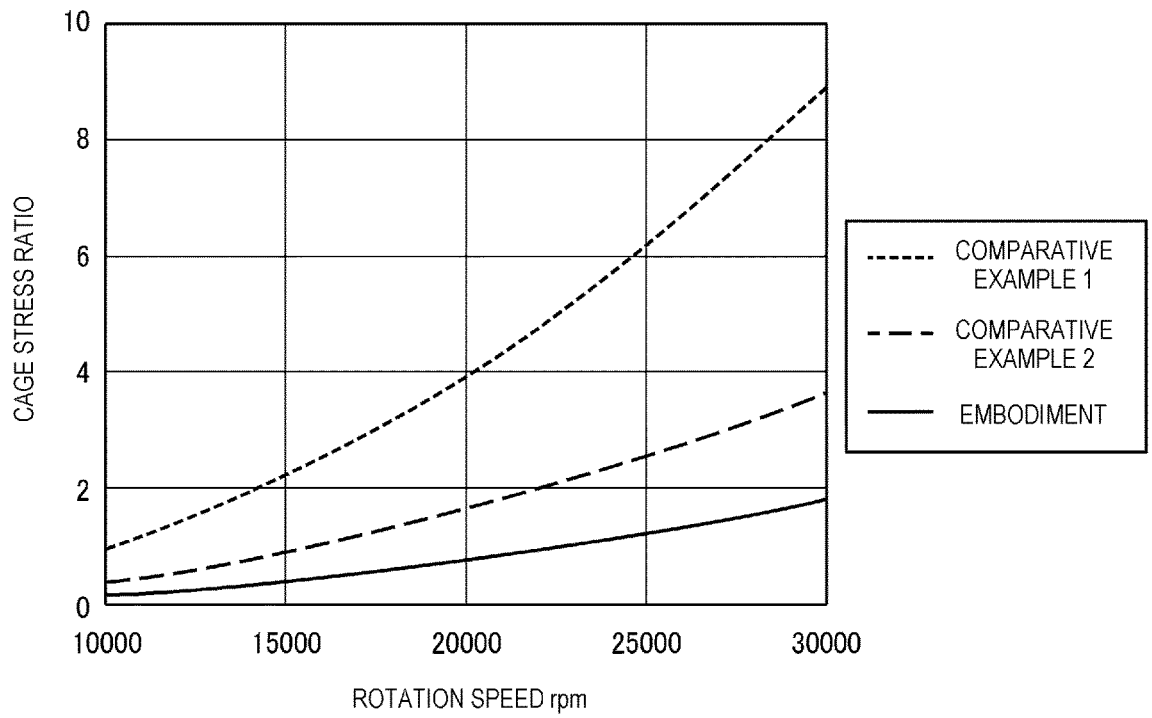
FIG. 9 is a graph showing a relationship between a rotation speed and a cage stress ratio in an embodiment, Comparative Example 1, and Comparative Example 2.
Figure 10:
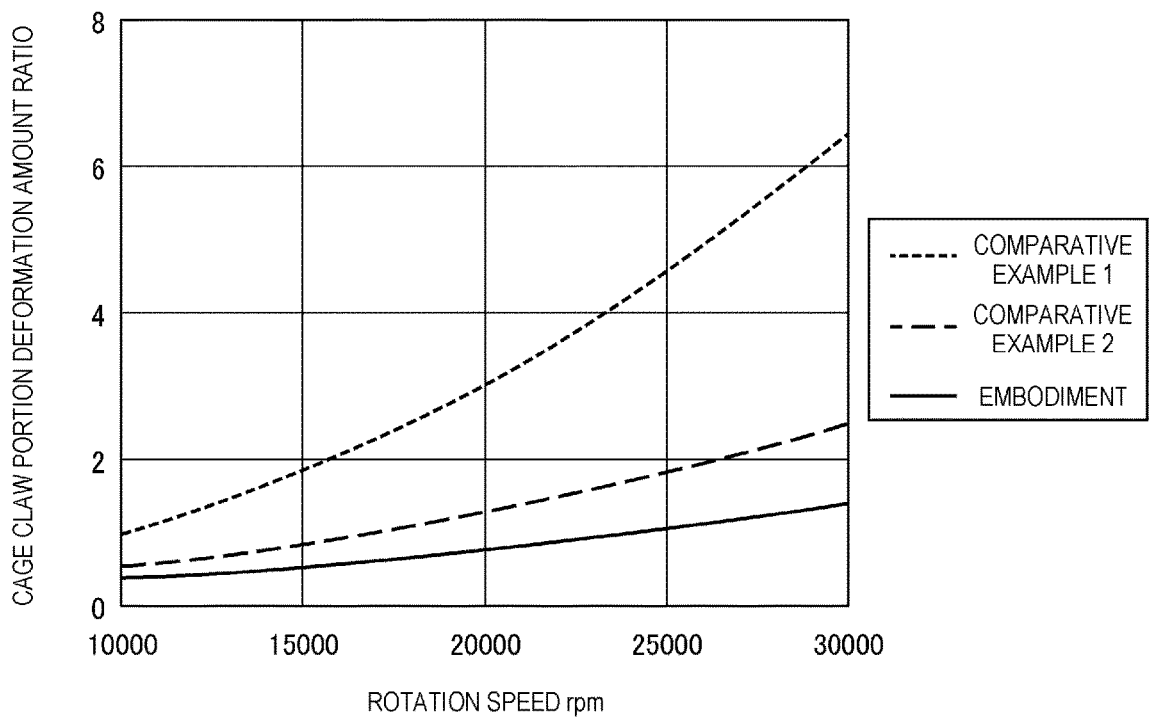
FIG. 10 is a graph showing a relationship between the rotation speed and a cage claw portion deformation amount ratio in the embodiment, Comparative Example 1, and Comparative Example 2.

FIGS. 9 and 10 show the relationship between the rotation speed and the cage stress ratio and the relationship between the rotation speed and the cage claw portion deformation amount ratio in each cage, respectively. The cage stress ratio and the cage claw portion deformation amount ratio are expressed as a ratio when each value of the cage 10a of Comparative Example 1 at 10000 rpm is defined as 1.

TABLE 1

|  | Comparative Example 1 | Comparative Example 2 | Embodiment |
|---|---|---|---|
| Bottom thickness ratio (based on Comparative Example 1) | 1 | 1.6 | 1.6 |
| Weight ratio (based on Comparative Example 1) | 1 | 1.14 | 0.8 |

In Comparative Example 1, since the stress of the cage at the high speed rotation is significantly increased compared to Comparative Example 2 and the embodiment, the deformation of the claw portion is also increased. As a result, it can be seen that reducing the bottom thickness for weight reduction is disadvantageous for the high speed rotation.

On the other hand, it can be seen that compared to Comparative Examples 1 and 2, both the stress and the deformation amount can be greatly reduced in the embodiment in which the weight reduction is achieved by forming the lightened portion 20 while leaving the wall portion 22 on the tip portion side of the bar portion 12. Further, it can be seen that both the stress and the deformation amount can be significantly reduced by a synergistic effect of reducing the thickness T1 of the wall portion 22 to such an extent that no problem occurs in the injection molding to achieve the weight reduction and making the bottom thickness of the pocket 13 thicker than the thickness T1 of the wall portion 22.

The present application is based on a Japanese patent application (Japanese Patent Application No. 2020-035971) filed on Mar. 3, 2020, the contents of which are incorporated herein by reference.

The invention claimed is:

1. A snap cage for a ball bearing comprising:
an annular main portion; and
a plurality of bar portions protruding axially from the main portion at predetermined intervals in a circumferential direction, and each including a pair of claw portions disposed at a tip portion at intervals from each other,
wherein a spherical pocket capable of holding a ball is formed between the adjacent bar portions,
wherein the bar portion includes the pair of claw portions, and an outer circumferential surface of the bar portion on a tip portion side is located on an inner diameter side with respect to an outer circumferential surface of the main portion,
wherein on the inner diameter side of the cage, a plurality of lightened portions obtained by notching in the axial direction from an axial side surface of the main portion to the respective bar portions are formed separately at positions of the respective bar portions in a circumferential direction,
wherein each of the lightened portions is formed separately from a surface of the pocket and an axially outer surface of the bar portion formed between the pair of claw portions,
wherein when an axial dimension of a wall portion formed between the axially outer surface of the bar portion and an inner wall surface of the lightened portion is T1 and an axial dimension of the main portion on a bottom portion of the pocket in a radial direction is T2, T2>T1 is satisfied, and
wherein the outer circumferential surface of the bar portion on the tip portion side is located at a position between ½ and ¾ of a radial thickness T of the main portion from an inner circumferential surface of the cage in the radial direction.

2. The snap cage for a ball bearing according to claim 1, wherein when the axial dimension T2 of the main portion and the radial thickness T of the main portion satisfies the relationship of T2>T/4.

3. The snap cage for a ball bearing according to claim 1, wherein the outer circumferential surface of the bar portion on the tip portion side and the outer circumferential surface of the main portion are connected by a concave curved surface, and the curved surface has a radius of curvature of 25 to 55% of a radial thickness T of the main portion.

4. The snap cage for a ball bearing according to claim 1, wherein a minimum radial thickness T3 of the bar portion in which the lightened portion is formed is substantially equal to the axial dimension T1 of the wall portion.

5. The snap cage for a ball bearing according to claim 1, wherein an entrance diameter of the pocket is 90 to 95% of a ball diameter.

6. The snap cage for a ball bearing according to claim 1, wherein a center of the pocket passes through the wall portion in the axial direction.

7. A ball bearing comprising:
an outer ring; an inner ring;
a plurality of balls disposed between raceway surfaces of the outer ring and the inner ring; and
the snap cage according to claim 1.

\* \* \* \* \*